Figure 1:
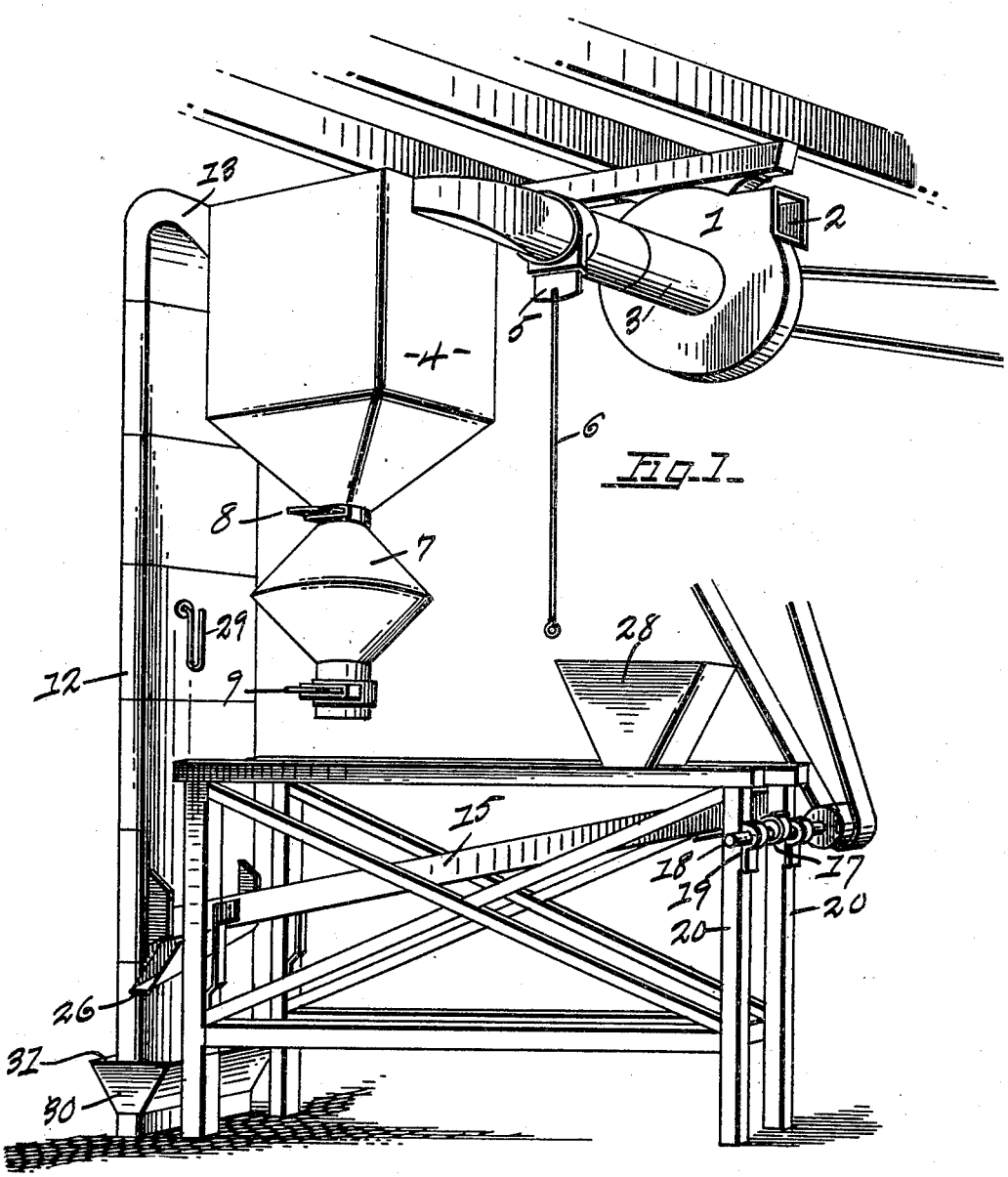

No. 696,870. Patented Apr. 1, 1902.
E. J. KESSLER.
MACHINE FOR CLEANING AND ASSORTING RAISINS.
(Application filed May 20, 1901.)
(No Model.) 2 Sheets—Sheet 1.

WITNESSES. INVENTOR.
Lawrence Love Edward J. Kessler
Chas Defenbaugh. By Carl H. Keller atty

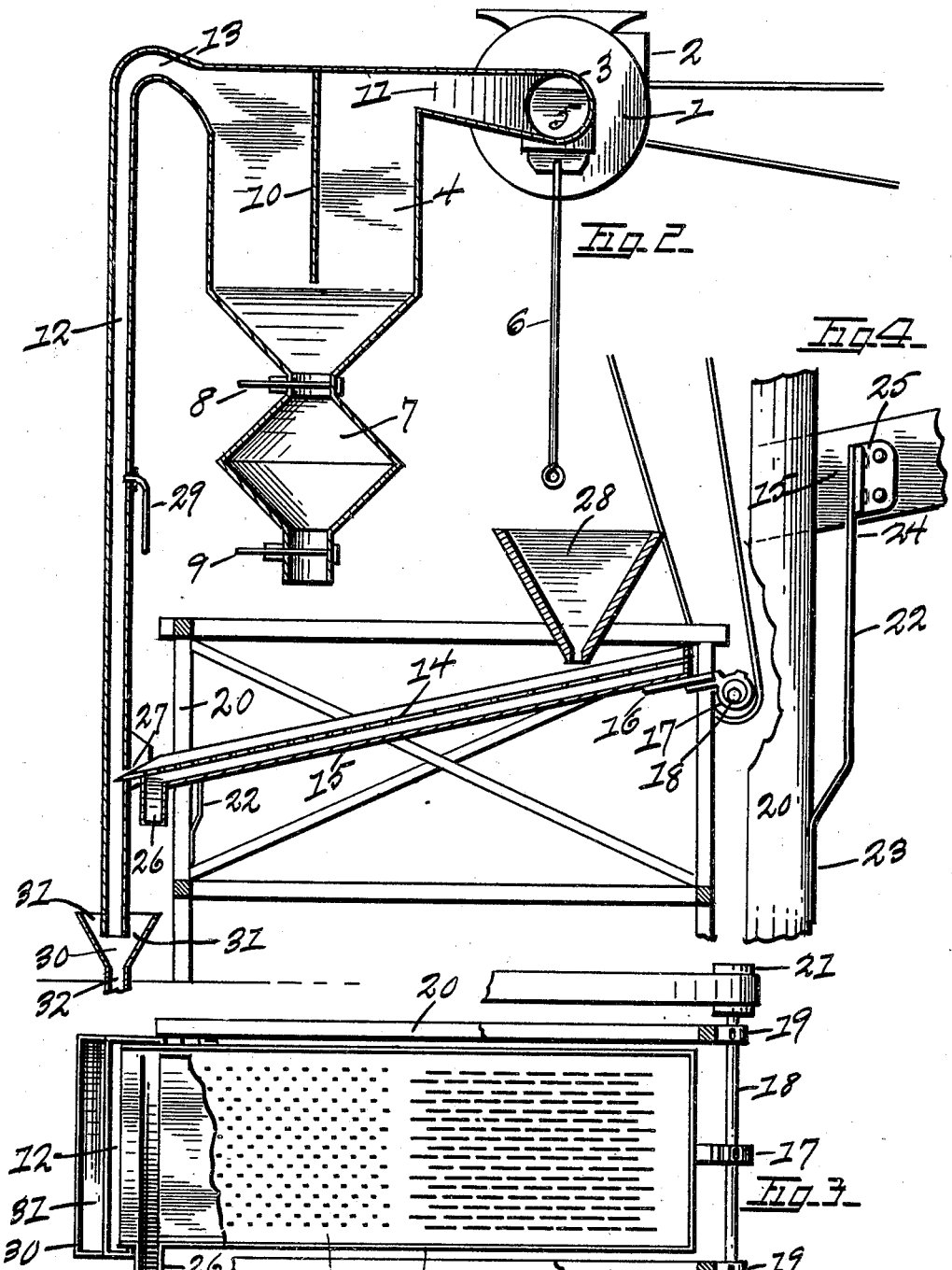

United States Patent Office.

EDWARD JOSEPH KESSLER, OF TOLEDO, OHIO, ASSIGNOR TO THE DOW AND SNELL COMPANY, OF TOLEDO, OHIO.

MACHINE FOR CLEANING AND ASSORTING RAISINS.

SPECIFICATION forming part of Letters Patent No. 696,870, dated April 1, 1902.

Application filed May 20, 1901. Serial No. 61,100. (No model.)

*To all whom it may concern:*

Be it known that I, EDWARD JOSEPH KESSLER, of Toledo, county of Lucas, and State of Ohio, have invented certain new and useful Improvements in Machines for Cleaning and Assorting Raisins; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention has reference to a machine for cleaning and assorting raisins, and has for its object the removal of all foreign material from the fruit in a more perfect and efficient manner than has heretofore been possible. Where raisins are shipped in bulk from the grower to the jobber, they contain a considerable quantity of foreign material, such as pieces of wood, stems, &c. Furthermore, all raisins prior to cleaning and assorting contain a large proportion of mummified fruit, which is termed "bullets," because of its shape and hardness, by those engaged in cleaning raisins for the market. Should these bullets be permitted to enter the seeding-machines at present extensively used and in which are employed hardened-steel disks provided with radially-extending peripheral teeth, the utility of such machines would be greatly impaired or entirely destroyed. The operation of repairing a seeding-machine after a bullet has passed into the same is accompanied by considerable expense, not only on account of the intrinsic value of the disks to replace those broken, but because of the loss of time to effect repairs. My invention practically accomplishes the removal of all foreign material and also the removal of the bullets from the bulk of the raisins, and the destruction of the disks in the seeding-machine is therefore insured against. By means of my invention I achieve other extremely valuable results not heretofore attained in the art. I am enabled in the employment of my invention to assort raisins into various grades for the market.

The principle upon which my invention operates is as follows: The best quality of raisins being large and solid have a greater specific weight than raisins of a poorer quality, the latter consisting of dried, shriveled, and "blowed" or hollow fruit. The specific weight of the former is also greater than the impurities and foreign material usually found in raisins when shipped in bulk, such as pieces of wood, stems, &c. If, now, the raisins as they are received in bulk are divided and advanced in a divided state into an upwardly-passing current of air, the poorer quality of fruit and the impurities will be carried along by the current, whereas the best quality of fruit will fall by gravity and be separated from the poorer quality. By varying the intensity of the current the separation can be made as effective as is desired.

In carrying out the principle upon which my invention operates I employ the arrangement hereinafter shown, described, and claimed.

In the drawings, Figure 1 is a perspective view of my invention. Fig. 2 is a vertical section thereof. Fig. 3 is a plan, partly in section, of the vibrating separator which I employ to loosen the stems from the raisins. Fig. 4 shows the means employed to support the vibrating riddle-case.

Referring to the parts, 1 is an ordinary exhaust-fan having a discharge at 2.

3 is a conductor-pipe connecting the exhaust-fan with a receiver 4. The volume of air passing through pipe 3 is regulated by a gate or slide 5, provided with a downwardly-extending rod 6 to permit of manually operating the slide. Receiver 4 is preferably constructed of sheet metal and is closed upon all sides. The lower portion thereof is in the form of a hopper to permit the raisins as they are deposited in the receiver 4 to be drawn off into an auxiliary receiver 7. The passage into and out of receiver 7 is controlled by slides or gates 8 and 9, respectively. By this arrangement the contents of receiver 4 can be withdrawn while the machine is in operation. This is accomplished by opening the passage controlled by slide 8, permitting the contents of receiver 4 to fall into auxiliary receiver 7. Slide 8 is then returned to its original position. The passage controlled by slide 9 is then opened and the contents of the auxiliary receiver withdrawn.

10 is a plate arranged in receiver 4 to cause the current of air therein to take a downward course on one side of the plate and an upward course on the other side thereof, passing out at 11 into pipe 3.

12 is a vertically-extending tube or conduit, preferably of flat, rectangular cross-section, which I shall term the "suction-leg." This is open at the bottom and extends upwardly to a point approximately level with the top of the receiver 4, where a return-bend 13 is formed of gradually-increasing diameter connecting with the receiver 4.

14 is a perforated riddle suitably secured in a vibrating riddle-case 15. Riddle-case 15 is inclined, as shown, and is actuated by a metal strap 16, one end of which is secured to the case, the other being connected with an eccentric 17, keyed upon a shaft 18, mounted in bearings 19, secured upon a frame 20.

21 is a pulley upon a shaft 18, adapted to be driven by a belt connected with any suitable source of power.

Any suitable means may be employed to support the riddle-case 15. I have, however, shown a preferred means in Fig. 4, in which 22 is a flat steel spring attached to the frame 20 of the separator at 23. The free end 24 of the spring is secured by means of an angle-casting 25 to the riddle-case 15. Riddle-case 15 is formed with bottom and side pieces, and the perforated riddle is elevated from the bottom and suitably secured to the side pieces, providing a passage for stems and other foreign material which may pass through the riddle. At 26 is a spout to discharge the material passing through the riddle. In the side of the suction-leg coincident with the end of the riddle-case is provided a slot 27, through which the raisins and foreign material are discharged into the suction-leg.

28 is a feed-hopper upon the separator-frame to receive the raisins in bulk prior to cleaning and assorting.

29 is an ordinary vacuum-gage connecting with the interior of the suction-leg to indicate the degree of exhaustion therein.

30 is a hopper provided at the lower end of the suction-leg, and at 31 are provided passages for air, the air being drawn into the suction-leg by the exhaust-fan 1. The outlet from hopper 30 is at 32.

In the operation of my invention the raisins are deposited in the hopper 28, together with the impurities they contain, the same falling therefrom upon the rapidly-vibrating riddle. Riddle 14 is preferably formed with two groups of perforations, those of one group being elongated, while those comprising the other group are round. As the riddle is inclined and owing to its rapid vibration, the raisins will advance toward the suction-leg, and the stems will be loosened from the fruit in the operation. The smaller stems and also the smaller bullets will pass through the perforations in the riddle and will be discharged from the spout 26. The raisins and the larger foreign material will be discharged into the suction-leg, in which they are met by an upwardly-passing current of air. The poorer quality of raisins, consisting of dried, crushed, shriveled, and blowed fruit, together with any stems or pieces of wood or other foreign material which may have passed down the riddle, will be carried along by the current of air in the suction-leg and deposited in the receiver 4. The superior grade of raisins, consisting of the large and fleshy fruit, after leaving the riddle fall, because of their greater specific weight, into the hopper 30 and are discharged at 32, from which point they are conveyed to the seeding-machine either directly or to be washed and then seeded. I have already described the means by which the raisins and foreign material deposited in receiver 4 are withdrawn therefrom. After the first separation the velocity of the current of air in the suction-leg is reduced and the contents of the receiver 4 is passed through the machine again. This operation is repeated until no considerable quantity of raisins suitable for the market are deposited in the receiver 4. In this manner by successively reducing the velocity of the air-current in the suction-leg the raisins coming from the machine will be uniformly graded, and the same will be entirely free from impurities. By noting the degree of exhaustion in the suction-leg, as indicated by the vacuum-gage 29, the same grades may at all times be obtained without the necessity of experimenting to ascertain what result the machine is accomplishing.

Having thus described my invention, what I claim as new, and desire to secure by Letters Patent, is—

1. A machine for cleaning and assorting raisins, comprising a receiver, a vertically-arranged tube leading therefrom, a tube leading from the opposite side of said receiver, an exhaust-fan at the end of said last-mentioned tube, a controller-valve interposed between said fan and receiver, whereby a draft may be created through both tubes and the receiver and its velocity may be controlled, means for supplying raisins to said tube, a receptacle for receiving raisins from the lower end of said tube, having a discharge-opening at its bottom for removing the products deposited therein and providing openings to permit of the passage of air into the lower end of the vertical tube, substantially as described.

2. A machine for cleaning and assorting raisins, comprising a vertical suction-tube open at its lower end, a supply-receiver at the upper end of said tube, a fan for creating a draft within said tube and receiver, means for supplying raisins to said tube near its lower end, a return-bend at the upper end of the suction-tube for deflecting to the receiver the products carried upward by said draft, an auxiliary receiver carried by the lower end of said supply-receiver, a valve for discharging the products from the supply-receiver into the auxiliary receiver, and a valve for discharging said products from the auxiliary receiver, whereby the supply-receiver may be emptied while the machine is in operation, substantially as described.

3. A machine for cleaning and assorting raisins, comprising in its construction a main receiver, a tube projecting from the receiver, an exhaust-fan at the outer end of the tube, a valve interposed between the fan and receiver, means for manually operating said valve, a vertical suction-tube discharging at its upper end into said main receiver, means for supplying raisins to said suction-tube, a plate within the main receiver for deflecting the air-draft, an auxiliary receiver beneath deflecting-plate of the main receiver and communicating with the main receiver, a valve for controlling such communication, a valve for emptying the auxiliary receiver, and means for controlling said emptying-valve, whereby said receiver may be emptied while the machine is in operation, substantially as described.

In testimony that I claim the foregoing as my own I affix my signature in presence of two witnesses.

EDWARD JOSEPH KESSLER.

Witnesses:
CARL H. KELLER,
LAWRENCE LOVE.